Oct. 22, 1929.                 W. D'A. RYAN                 1,732,914
                                HEADLIGHT
                         Filed Feb. 17, 1926        6 Sheets-Sheet 1
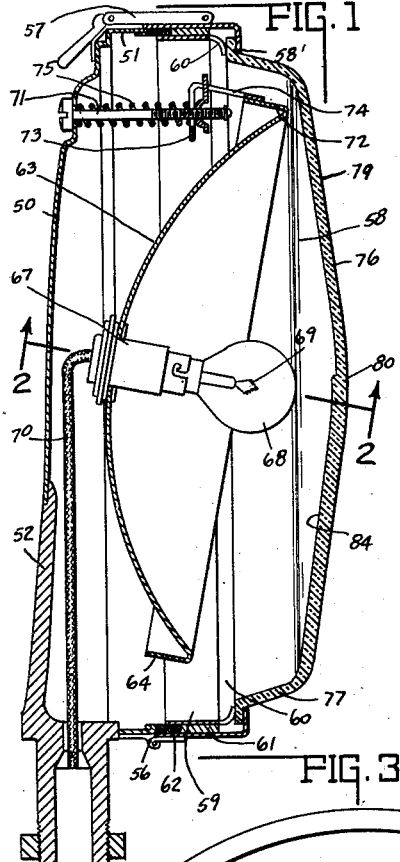
INVENTOR.
WALTER D'ARCY RYAN,
BY
ATTORNEYS.

Inventor:
Walter D'Arcy Ryan
by His Attorneys

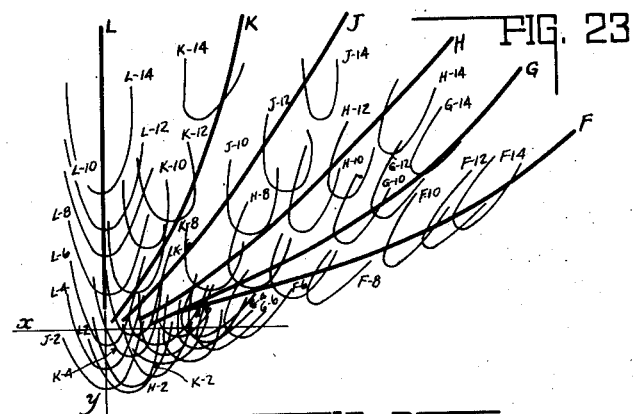
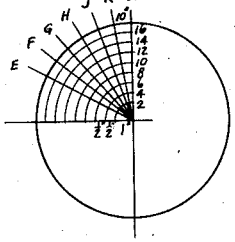
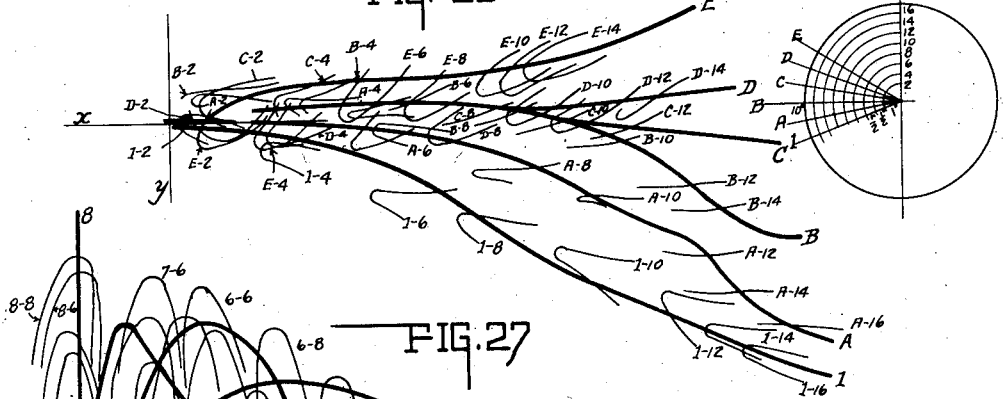
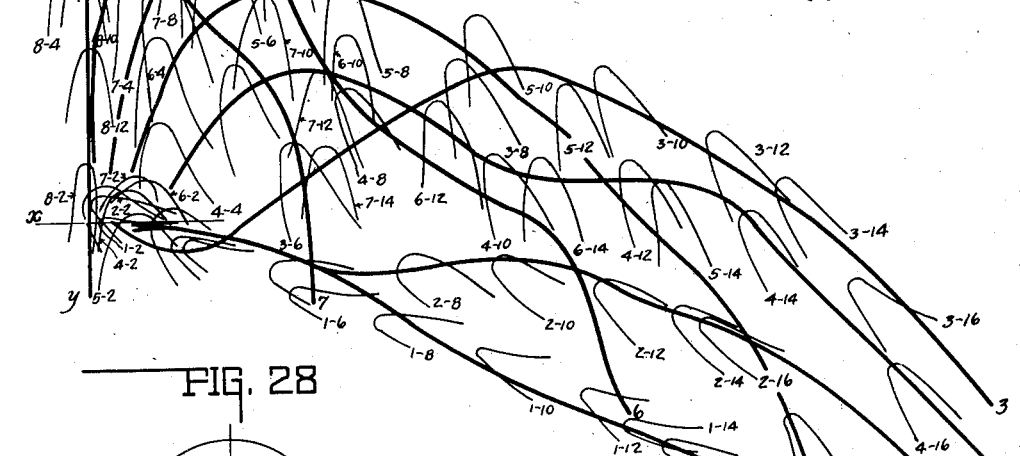
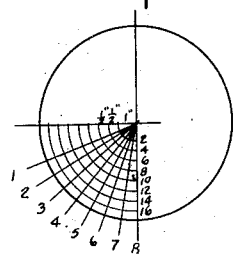

Patented Oct. 22, 1929

1,732,914

UNITED STATES PATENT OFFICE

WALTER D'ARCY RYAN, OF SCHENECTADY, NEW YORK

HEADLIGHT

Application filed February 17, 1926. Serial No. 88,911.

My invention relates to improvements in headlights and is particularly concerned, though not necessarily limited, with improvement in headlights for automotive vehicles.

It is the object of my invention to provide a headlight that will illuminate the areas immediately in front of and at both sides of the vehicle by which it is carried, and also, perhaps, illuminate the forward portion of the vehicle so that the headlight itself will be surrounded by an area that is quite brightly illuminated, and in this manner the contrast between the intensely illuminated reflector of the headlight and its surroundings will be greatly reduced.

I accomplish the above and other objects of my invention by providing a headlight in which the reflector is so conformed that most of the light reflected by the lower half of the reflector is thrown up into and substantially superimposed upon the light in the beam produced by the upper half of the reflector, and part of the light from the lower half of the reflector is concentrated in the top of the central area of the beam produced by the upper half of the reflector.

This arrangement produces a beam that is more or less crescent-shaped in cross section and has a greater intensity in the upper central area of the beam than at any other point or region. The direct light from the source, passing through the lens, without reflection from the reflector, in addition to some reflected light, provides adequate illumination of the roadway immediately ahead of the vehicle.

To insure adequate illumination of that part of the roadway that lies intermediate the immediate foreground and that portion of the road reached by the top portion of the beam, I provide a lens comprising means for diffusing light from the end regions of the crescent beam toward the center of the road and also provide means for diffusing some of the light from these portions of the beam toward the sides of the road, that is, into the curbs, ditches, fences, etc., at the sides of the road.

Furthermore, I have found that the headlight described herein has a non-sensitive region for the source of light, of comparatively large dimensions, thereby permitting considerable variation in the size and position of the source of light without material, or at least, without detrimental effect on the character of the beam and illumination produced.

Figure 1 is a vertical section through a headlight embodying my invention;

Figure 2 is a transverse section taken on the line 2—2 of Fig. 1;

Figure 3 is a front elevation of the lens that I prefer to use with the reflector to be described herein;

Figure 4 is a section, on an enlarged scale, taken through line 4—4 of Figure 3;

Figure 5 is a detail section, on an enlarged scale, taken on line 5—5 of Figure 3;

Figure 6:
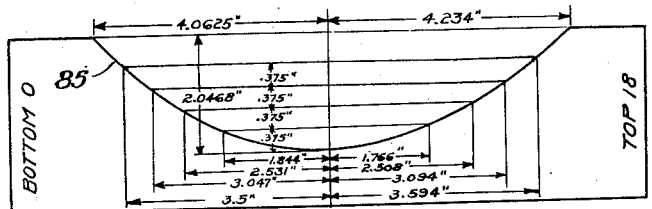
Figures 6, 7, 8, 9, 10, 11, 12, 13, 14 and 15 show the outline of templates used in producing the drawing die-head shown in Figure 16.
Figure 7:
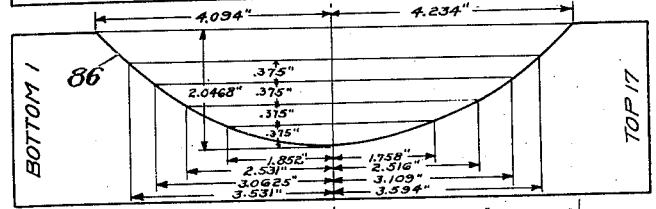
Figure 8:
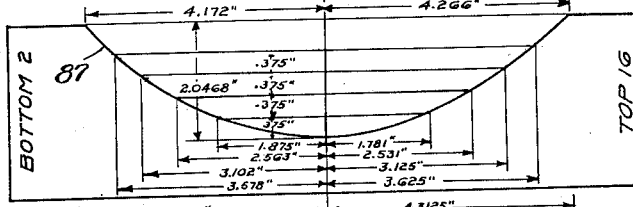
Figure 9:
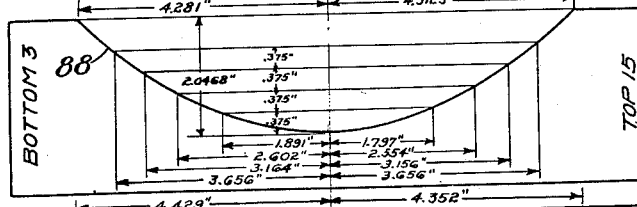
Figure 10:
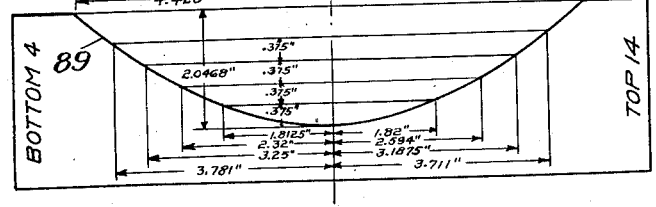
Figure 11:
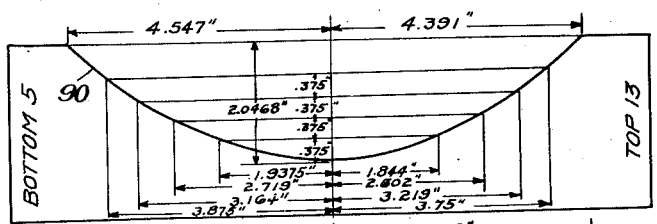
Figure 12:
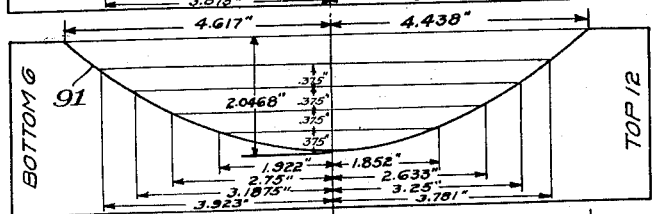
Figure 13:
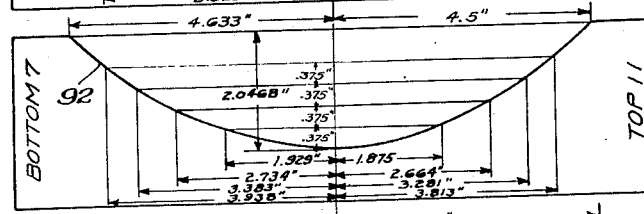
Figure 14:
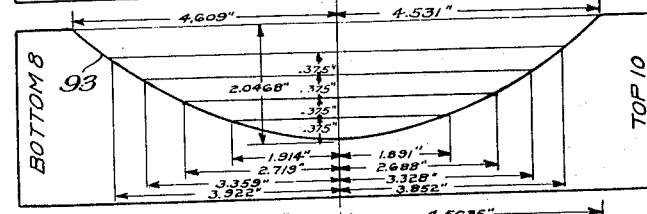
Figure 15:
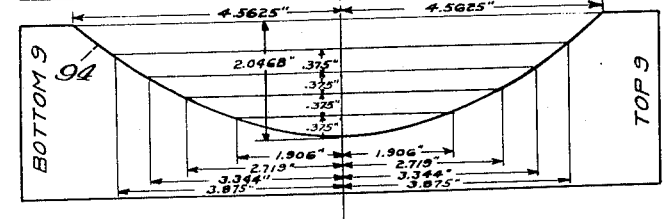

In Figures 17 to 22, inclusive, the screen intersecting the beam was ten feet distant from the reflector.

Figure 23 is a set of light distribution curves that are useful in determining to some extent the intensity of illumination in the various parts of the beam produced by the reflector. These curves relate to the distribution of light from the upper portion of the reflector.

Figures 25 and 27 are views similar to Figure 23 but relating to a distribution of light from the central side portion of the reflector and bottom, respectively; and Figures 24, 26 and 28 are charts to be used in connection with Figures 23, 25 and 27, respectively.

Throughout the several views similar reference characters are used for referring to similar parts.

My improved headlight comprises, in general, a housing comprising the back 50 and the cylindrical side wall 51 which are here shown as being integrally formed. A more or less hollow cylindrical stem 52 is secured to the back and extends downwardly to be connected in any suitable manner upon the vehicle. A door ring or bezel 55 is mounted upon the side wall 51 by means of a hinge 56, and any suitable sort of latch mechanism 57 may be used for holding this door ring in position. The bowl-shaped lens 58, a more detailed description of which will later be given, is held in the door ring, or bezel, by means of the ring 59 having the flange 60 which yieldingly engages the flange 58' of the lens. The rings 55 and 59 are riveted, swetted, or otherwise secured, to the stiffening ring 61, and a gasket 62, preferably of rubber, is inserted between the edge of the cylindrical wall 51 and the adjacent edge of the stiffening ring 61 to exclude dust, moisture, etc.

The reflector 63, to which more detailed reference will later be made, comprises a backturned stiffening ring 64 and is supported by brackets 65 carried by the back of the housing, the connection between the bracket and the reflector being made by means of screws, or pivot pins, 66 that extend through the stiffening ring 64 and the brackets 65. A socket 67 is suitably mounted in the reflector for receiving the base of the electric lamp 68. Preferably, as is the usual practice, the metallic portion of the socket 67 is connected with one terminal of the filament of the lamp 68 and grounded through the metallic portions of the lamp upon the frame of the vehicle. The lamp 68 may have any suitable type of filament, but is here shown as being provided with the usual V type of filament 69. This filament, as shown in Figure 1, lies just outside the plane passing through the edge of the reflector. An electric cord, or cable, 70 may be used for conducting the current to the lamp.

For certain reasons, hereafter referred to, I prefer to tilt the axis of the reflector so that it meets the road in advance of the vehicle and for suitably holding the reflector in its tilted position I may provide an adjusting mechanism comprising the screw 71 that is rotatably mounted in the back of the housing and which passes through a nut 72. This nut engages the downturned portion 73 of a bracket 74, secured to the flange of the reflector, and a spring 75, confined between the back of the housing and the downturned portion 73 of the bracket, tends to hold the latter in contact with the nut. In this manner, by turning the screw 71, the nut 72 can be adjusted throughout a considerable range and the tilt of the reflector is determined by the position of the nut.

The lens for my improved reflector may take various forms, but I find that the one shown in Figures 1 and 2 operates satisfactorily. This lens 58 has a flattened, conical front portion 76 and a marginal flange 77 that extends at a slight angle to the axis $x$—$x$, of the lens. In this embodiment of the lens it is of substantially uniform thickness throughout and is not provided with any special diffusing or defracting means, although if it is desired the center portion thereof, immediately in front of the filament, may be slightly frosted.

In Figures 3 to 5, inclusive, I have shown a preferred embodiment of the lens 78 comprising a front portion 79 that is more or less the shape of a flattened cone, but in which the rounded apex 80 is positioned slightly below the axis of the lens, so that it will lie almost directly in front of the filament of the lamp when the reflector is tilted as shown in Figure 1.

A series of refracting prisms extend vertically across the bowl. As shown in Figure 3, the series of prisms at each side of the lens extend almost equally above and below a center line drawn through the lens, whereas the tops of the intermediate prisms terminate somewhat below this line. This leaves a very considerable area of the lens without any means for materially modifying the beam produced by the reflector.

From an inspection of Figures 2, 3 and 4 it will be noted that the prisms 81 at each side of the lens, are of such character as to considerably refract the light incident thereon toward the center of the beam. The intermediate prisms 84, shown on an enlarged scale in Figure 5, are symmetrical about vertical axes and tend to distribute light incident thereon horizontally in both directions. I shall later refer to the coaction between the lens described above and the particular form of reflector forming a part of my invention.

Figure 16:
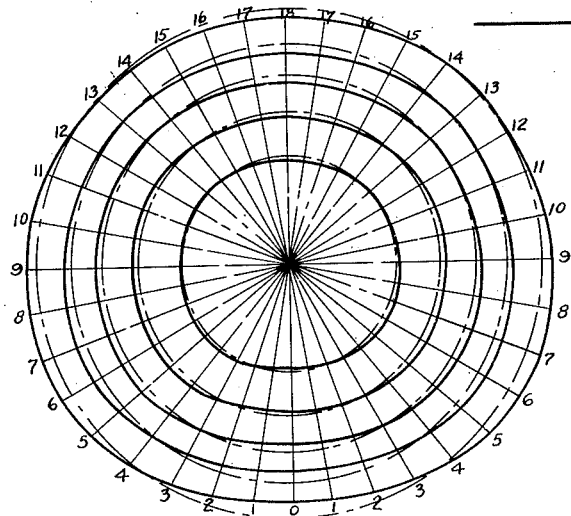
Figure 16 is an end elevation of the drawing die-head, and in addition, comprises contour lines, drawn in solid lines, and dotted circles intersecting each of the contour lines to show the deviations from true circles of sections taken on the several contour lines.

The shape, or contour, of the reflector forming a part of my improved headlight is clearly indicated by the templates of Figures 6 to 15, inclusive, and the end elevation (Figure 16) of the drawing die which I use in the manufacture of one form of the reflectors. This drawing die is preferably made of cast iron and its contour can be determined by means of the templates referred to in Figures 6 to 15, inclusive. In these figures I have attempted, as accurately as possible, to disclose the curvature, or contour, of one form of the reflector forming a part of my invention. The curved line 85 of the template shown in Figure 6 is the curvature of the line that would be formed by the intersection of a plane passing through the line 0—18 in Figure 16 and parallel with the axis of the reflector. That is, this plane would be normal to the plane of the paper upon which Figure 16 is made. In a similar manner, the curves 86 to 94, inclusive, of Figures 7 to 15, respectively, indicate the curvatures of the die-head on the lines 1—17, 2—16, 3—15, 4—14, and so on, down to line 9—9 for the curve 94.

Figures 6 to 16, inclusive, are substantially half scale drawings and, as stated, have been made as accurately as possible, but in order to enable any one skilled in the art of drawing headlight reflectors to reproduce the die from which I have made one form of reflector described and claimed herein, I have indicated dimensions upon each of Figures 6 to 15, inclusive, that will enable any one skilled in this art to make such a die-head. It is believed that the application of these dimensions is so clear that any one can follow them without further instructions, although it might be stated that the lines that extend horizontally across the templates, and all of which, except the outer two, are intended to indicate the intersection of a plane, passed through the die-head perpendicular to the axis of the die-head.

The dotted circles of Figure 16 have nothing to do with the shape of the die-head or reflector, except that they are useful for indicating the extent to which any section of the reflector perpendicular to its axis varies from a true circle such as would result if the reflector were, or had, a true surface of revolution.

An inspection of Figures 6 to 15, inclusive, will disclose that in the embodiment of my invention disclosed by said figures the reflector is more or less conoidal in contour. This particular form is not, however, a true surface of revolution. By reference to Figure 16 in particular it will be seen that the top portions of the reflector are bent toward the axis more closely than the side portions and that the bottom portions of the reflector are bent toward the axis more closely than the top. The side portions are not symmetrical about an axis coinciding with the line 9—9 of Figure 16, in that the maximum outward displacement of the sides from a true surface of revolution takes place along lines corresponding to lines 7—11 of Figure 16.

From an inspection of Figure 16 it might appear that the variation in contour of my reflector from that of the original hyperboloidal reflector is not great, but it will be seen from the explanation about to follow that whatever variations do exist have produced marked changes in the character of the beam produced by the reflector.

With my improved form of reflector indicated in Figures 6 to 16, inclusive, the depressing, or distortion, of the upper portion of the reflector toward the axis has the effect of very considerably depressing the top portion of the beam and concentrating the light in the top portion of the beam, although it is not depressed sufficiently to bring the rays into parallelism with the axis of the reflector. However, when the reflector is tilted, as described above, the rays in the top portion of the beam are depressed slightly so that they cannot strike the face of the driver of an approaching car.

In the reflector of Figures 6 to 16, the elevating of the lower portions of the reflector produces an even more marked change in the character of the beam from the lower portion of the reflector than the depression of the upper part of the reflector has upon the beam from the upper portion of the reflector, because, in addition to being elevated more than the top portions are depressed, the lower portion of the reflector is actually positioned forward so as to cause the lower portion of the edge of the reflector to extend beyond the side and upper portions. But this protruding portion is cut off so as to make all parts of the edge of the reflector lie in substantially the same plane. This forward positioning of the bottom portion of the reflector, in combination with the raising or elevating of the same, causes the light reflected from the lower portion of the reflector to take an upwardly inclined direction in place of a downwardly inclined direction as would occur with a true hyperboloidal reflector.

Figure 17:
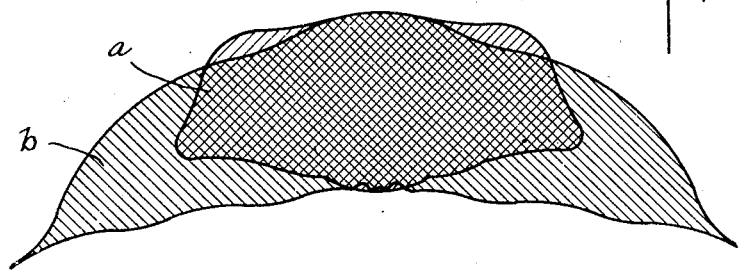
Figure 17 is the outline of a cross section of beams of light produced by the top and lower halves of the reflector with the lamp on the axis and positioned just outside of the plane of the edge of the reflector.

The result of this arrangement, with the electric lamp or source of light placed in the focal region or at a point that would more or less coincide with the focus of the reflector, if it were a true hyperboloidal reflector, that is, a point lying on the axis just outside the plane of the edge of the reflector, is that the beam produced by the upper half of the reflector at a point some ten feet in advance of the reflector has a cross section with an outline similar, in general, to that shown at a in Figure 17, and the cross section of the beam produced by the lower half of the reflector has an outline similar to that shown at b. Such a beam has valuable characteristics in that it is convex on top and, therefore, does not interfere with approaching drivers, and in that a good bit of the light that a true hyperboloidal reflector would throw onto the road immediately in front of the vehicle where it is not required and into the fields at the side of the road, is forced up more or less into the top of the beam where it is useful in illuminating the roadway much farther in advance of the vehicle, it being understood, of course, that in order to illuminate the roadway farther in advance of the vehicle with an intensity that is useful for driving purposes, the intensity of the beam that illuminates that part of the roadway must be greater than is required for the illumination of the roadway closer to the vehicle.

Whereas in the specific structure shown herein, the light source is positioned directly on the plane through the forward edge of the reflector, and said plane extends substantially through the focal region thereof, it will be understood that wherever additional light on the road is desirable the reflecting surface may be carried forwardly of the focal region and light source without materially altering the character of the beam projected thereby. In such a structure obtaining the same desirable results as herein shown and described in detail, the surface of the reflector would still be substantially in the rear of the plane passing through the focal region of the reflector thus effecting a comparatively shallow reflector as distinguished from the deeper reflector having the greater portion of the reflecting surface forwardly of the plane through the focal region.

Figure 18:
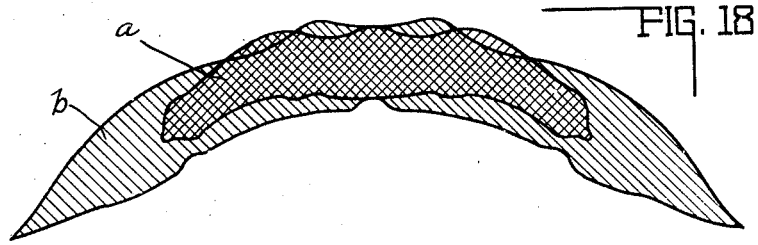
Figure 18 is the outline of a cross section of the beams of light produced by the top and lower halves of the reflector when the lamp is positioned substantially three eighths of an inch below the axis of the reflector and just outside of the plane of the edge of the reflector.
Figure 19:
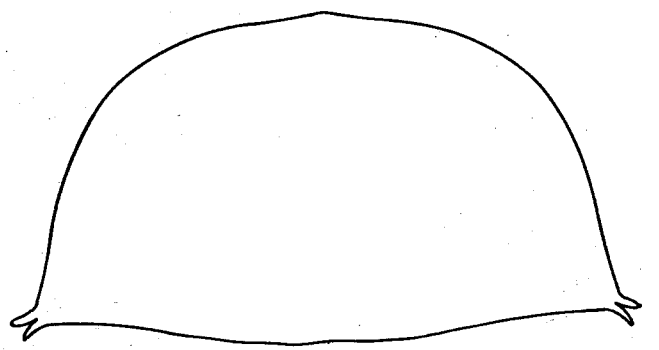
Figure 19 is the outline of the cross section of the beam produced by the whole reflector when the lamp is on the axis and approximately three eighths of an inch behind the plane of the edge of the reflector.
Figure 20:
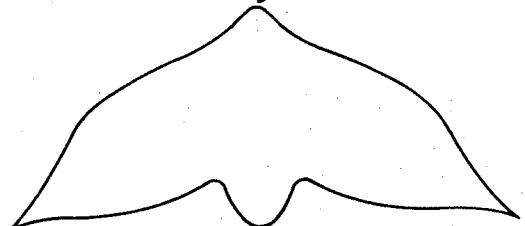
Figure 20 is the outline of the cross section of the beam produced by the whole reflector when the lamp is on the axis of the reflector and approximately three eighths of an inch ahead of the plane of the edge of the reflector.
Figure 21:
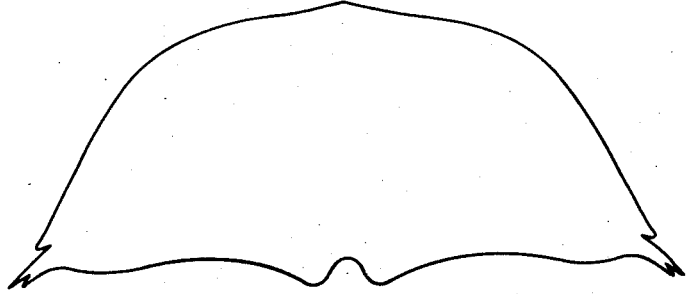
Figure 21 is the outline of the cross section of the beam produced by the whole reflector when the lamp is approximately three eighths of an inch below the axis and three eighths of an inch behind the plane of the edge of the reflector.
Figure 22:
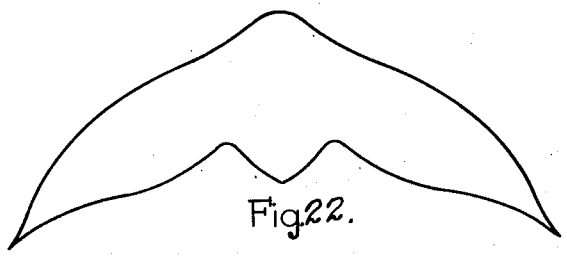
Figure 22 is the cross section of the beam produced by the whole reflector when the lamp is approximately three eighths of an inch below the axis of the reflector and three eighths of an inch ahead of the plane of the edge of the reflector.

It should be kept in mind that in Figures 17 to 22, inclusive, the beams of light are not of equal intensity throughout the cross sections, and this remark applies to Figure 17 to a greater extent than to the beams shown in section in Figure 18, the source of light to produce which, as stated above in the brief description of these figures, was displaced downwardly in front of a reflector of the form of Figures 6 to 16, described herein, substantially three eighths of an inch below the axis of the reflector. This has the effect of slightly elevating the rays in the beam produced by the upper portions of the reflector but very much more raising the rays in the beam produced by the lower portions of the reflector, and in each case, the rays from the bottom of the reflector are elevated more than those from the top, so that as a result the beams produced by the upper and lower portions of the reflector, respectively, are not as deep as when the source of light is positioned on the axis of the reflector, but the intensity of light in the beam is increased. This is clearly shown in Figure 18, in which, as stated above, a and b are outlines of the sections of the beams produced by the upper and lower portions, respectively, of the reflector.

The outward displacement of the sides of the reflector, which is greatest in the general direction of the lines extending from the axis of the reflector to the numbers 7 in Figure 16, produces the effect of spreading outwardly toward the sides of the road the lower sides of the crescent shaped beams and gradually reducing the intensity of these portions of the beams in directions away from the center of the road, thereby producing the useful function, set out above, of illuminating the sides of the road, the ditches, fences, etc., at some distance in advance of the vehicle. Between these portions of the beams, indicated at b in Figure 18, there is an area in which the intensity of illumination is relatively low and it is to correct this deficiency that I make use of the refracting prisms of the lens shown in Figures 3 to 5, inclusive. The side prisms, especially, act to direct rays from the portions b of the beam into what would otherwise be a relatively darker area, as well as also to refract toward the sides of the road some of the light in these portions of the beam. It will be understood that the central portions of the beam are those portions that are effective in illuminating the road at the greatest distance from the vehicle and points nearer to the vehicle, but that the portions of the road immediately in front of the vehicle are illuminated by the direct rays of light passing through the lens without reflection by the reflector. These rays are more or less evenly distributed by the center refracting prisms of the lens.

Reference to the charts shown in Figures 24, 26 and 28, and to the light distribution curves of the corresponding Figures 23, 25 and 27, respectively, will make the nature of the beam produced by my reflector somewhat more apparent. These curves were obtained by placing in front of a reflector of the form of Figures 6 to 16, a disc, pivoted to be rotatable about the axis of the reflector, and having a narrow radial slot extending from a point near the axis to the periphery of the reflector. This slot was then successively moved to positions corresponding to the lettered radial lines of Figures 24, 26 and 28 and a screen was placed in front of the reflector at a distance of approximately twelve feet from the lens, with the result that in each position a narrow beam of light was thrown upon the screen and the shape of this beam was indicated upon the screen by a line. The slot was then moved to the next position and the process repeated. Figure 23 shows the set of lines that resulted from the exploration of the upper portion of the reflector indicated in Figure 24, the lines of Figure 25 resulted from exploration of the region indicated by the lettered lines in Figure 26 and the lines of Figure 27 from the numbered lines of Figure 28.

From an inspection of Figures 23 and 25 it will be seen that the distribution of light from the upper half of the reflector is fairly regular, although along certain lines there is apparently a tendency for the light to converge. This is indicated by the coinciding of lines B, C and D throughout the greater portion of their length.

The curves forming Figure 27 are of considerable interest because they clearly show the tendency of the lower portions of the reflector to throw the rays reflected from these portions up into the area of the beam produced by the upper portions of the reflector. It should be understood that the inner ends of the numbered lines in Figures 23, 25 and 27 terminate at substantially the same point which, of course, indicates that the beam produced by the lower portions of the reflector is substantially superimposed upon the beam produced by the upper half. Lines 4, 5, 6 and 7 of Figure 27 clearly indicate that the portions of the reflector lying close to the central axis and between the lines 5 and 8 tend to elevate the rays reflected therefrom, and that this tendency gradually increases and then decreases until the rays reflected from the outer portions of the reflector lying between the lines 5 and 8 actually direct the rays downwardly. This is clearly indicated by the fact that these curves have reversely curved portions, the ends of which lie below the horizontal axial plane, indicated by the intersection of the two light lines $x, y$. This characteristic is present in curves 2 and 3 but not to as great an extent. It is quite probable that line 8 of Figure 27 includes a reversely directed portion but this portion coincides with the outwardly directed portion so that its true character does not appear in this figure.

It will be apparent that if the curves of Figures 23, 25 and 27 are superimposed upon each other and an outline is traced about the mass of curves thus produced, this outline will roughly assume the form of half of a crescent, convex on its upper side, and this is really the true shape of the beam as has heretofore been explained in connection with Figure 18.

The reversely curved outer portions of curves 5, 6 and 7 of Figure 27 indicate that the light reflected from the lower portion of the reflector, defined by lines 5 to 8, Figure 28, does not diverge as rapidly as the light reflected from the portions lying above this portion. As a result, the intensity of illumination in the beam produced by the portion of the reflector lying between the lines 5 and 8 is greater than the intensity of the beam produced by portions of the reflector lying above this region.

Further reference to Figures 23 to 28, inclusive, will make the operation of the reflector somewhat more clear, because these figures also indicate, somewhat more specifically, the intensity of the light in the various parts of the beam. The filament shaped lines of Figures 23, 25 and 27 were obtained by making use of the same slotted disc, but in each radial position of this slot all of the slot, except a small opening, was covered and this small opening was shifted along the slot in each of its positions to positions corresponding to the circles numbered 2, 4, 6, 8, etc., in Figures 24, 26 and 28.

It will, of course, be understood that with each position of this small opening the beam of light passing therethrough defined a more or less irregular image of the filament of the lamp upon the screen. The images of the filament thus produced were copied upon the screen and later transferred to paper so that they could be reproduced in Figures 23, 25 and 27. It is possible, by reference to Figures 24, 26 and 28, respectively, to determine the position of the opening that produced each of the filament images. For instance, in Figure 23, the filament image designated by L—14 was produced when the slot was in the position of line L of Figure 24 and the opening was approximately on the circle 14. In the same way the filament image L—2 was produced with the slot in the same position but the opening on circle 2. By thus comparing the designations of the filament images with the letters and numbers of Figure 24, the exact position of the opening producing any image of the filament can be determined.

This same method of determining the position of the opening for any filament image of Figures 25 and 27 can be used in connection with Figures 26 and 28, respectively. By reference to Figure 23 and Figure 24 it will be seen that when the opening was at point 2 on line L the filament image L—2 was produced, and that as the opening was successively moved to points 4, 6, 8, 10, the position of the image moved upwardly in more or less uniform relation, thereby indicating that this portion of the reflector acts more or less uniformly in reflecting the light from the source.

A similar inspection of the filament images produced by moving the slot from positions 2 to 12 on line 8 of Figure 28 indicates a very markedly different performance. The filament images 8—2 and 8—4 are separated very much more than are images L—2 and L—4 and the same comment applies to filament images 8—4 and 8—6 as compared with L—4 and L—6 of Figure 23, and filament image 8—10, in place of being positioned outside or above filament image 8—8, as it would if the reflection from the lower portion of the reflector were uniform and regular, lies quite a distance inside or downwardly from filament image 8—8, indicating that some place between the points 8 and 10 on the line 8, the characteristic of the reflector changes.

Similarly, in tracing the positions of the filament images produced by the opening as it is shifted along the slot in the position of line 7 of Figure 28, shows that after the opening reached the point 6 on line 7, the character of the reflector changed, because the filament image 7—8 lies downwardly from filament image 7—6. Therefore, some place between the points 6 and 8 on line 7 of Figure 28 there is a change in the character of the curvature of the reflector that is responsible for the reverse curve in line 7 of Figure 27.

The spacing of the filament images in Figures 23, 25 and 27 is a more or less rough index of the intensity of the light in the various portions of the beam represented by these curves, although the extreme congestion of the filament images at the points where the lines A to L and 1 to 8 converge is due to their convergence and cannot, for that reason, be relied upon as a true index of the intensity at their point of convergence. From an inspection of Figure 27 and of Figure 23, it will be apparent that the beam produced by the headlight as a whole has a greater intensity along its top side than at the bottom, and that the beam has a greater intensity at its center than at its sides. The utility of this feature of the beam has heretofore been explained and for that reason will not be repeated.

It will also be apparent from the above description that I have produced a headlight reflector in which the top and bottom portions produce beams, the rays of which are in general divergent, that is, they spread outwardly from the reflector, but said beams are mutually convergent, that is, the beam produced by the lower half of the reflector converges with and becomes superimposed upon, or coincident with, the beam produced by the top portion of the reflector.

From the above description it will be apparent that I have produced a headlight comprising a source of light, a reflector of novel construction and a lens of novel construction, so inter-related in their shape and dimensions as to produce a maximum efficiency in the distribution of the light produced by the source and have, at the same time, avoided producing areas in which there is a violent contrast between the illumination. In this way it becomes possible for the eye of the driver easily to adjust itself to all portions of the illuminated area, thereby giving the driver a sense of security.

I have also produced a headlight in which the element of glare is, for the reasons described above, reduced to a minimum, and one that is simple in construction and economical to manufacture.

While I have described the details of construction of the preferred embodiment of my invention, it is to be clearly understood that my invention is not limited to these details but is capable of other adaptations and modifications within the scope of the appended claims.

Having thus described my invention, what I claim is:

1. In a vehicle lamp comprising a generally focalizing reflector having a focal region, a light source substantially in the focal region, the major portion of the reflector above the axis being deformed from a surface of revolution to project a substantially crescent shaped beam with horns down, and the major portion of the reflector below the axis being deformed from the surface of revolution to project a substantially crescent beam of light, the beams being substantially super-imposed.

2. A headlight comprising a reflector, a source of light positioned within the focal region thereon and co-acting therewith, said reflector comprising top and bottom portions each producing a beam having a cross-section that is an inverted crescent in shape, said top and bottom portions being positioned with respect to each other to cause a substantial coincidence of said beams.

3. In a vehicle lamp comprising a generally focalizing reflector having a focal region, a light source substantially in the focal region, said reflector having the major portions above and below the axis of said reflector bent toward the axis and the major portions of the side sections bent away from the axis, the lower major portion being bent toward the axis more closely than the upper major portion so as to substantially super-impose its beam over the beam projected by the upper major portion, whereby said reflector will project a downwardly curved driving beam having a greater intensity of light in the upper central area thereof.

4. In a vehicle lamp comprising a generally focalizing reflector having a focal region, said reflector having the major portions above and below the axis of said reflector bent toward the axis and the major portions of the side sections bent away from the axis, the lower major portion being bent toward the axis more closely than the upper major portion, and a source of light positioned in the focal region of said reflector so as to coact therewith to project a pair of laterally diverging beams substantially super-imposed upon each other and having their upper boundary lines curved downwardly.

5. In a vehicle lamp comprising a generally focalizing reflector having a focal region, a light source substantially in the focal region, the major portions of the reflector above and below the axis being deformed from the surface of revolution to extend forwardly thereof with the lower portion extending a greater distance forwardly of the surface of revolution than the upper portion, and the major portions of the reflector laterally of the axis and intermediate the upper and lower portions being deformed to extend rearwardly of the surface of revolution, whereby a downwardly curved beam of light will be projected by the reflector from the reflecting surface below the axis thereof and super-imposed on a portion of the beam projected from the reflecting surface above the axis to give a greater intensity of light in the upper central area thereof.

6. In a vehicle lamp comprising a generally focalizing reflector having a focal region, a light source substantially in the focal region, said reflector being deformed from a surface of revolution to project a downwardly turned substantially crescent shaped beam of light in cross section, and a lens positioned over said reflector having prisms formed in a section of its surface for intercepting the lower and side portions of said beam for spreading the same laterally and an upper central clear section permitting the upper portion of said beam to be projected therethrough unobstructed.

7. In a vehicle lamp comprising a reflector having a focal region, a source of light in said focal region, the major portions above and below the axis of said reflector being bent toward the axis and the major side portions of the reflector being bent away from the axis, the lower major portion being bent toward the axis more closely than the upper portion and a lens for said reflector having means at each side thereof to deflect the light toward said axis and intermediate means to spread the light horizontally in opposite directions.

8. In a vehicle lamp comprising a reflector having a focal region, the major portions above and below the axis of said reflector being bent toward the axis and the major side portions of the reflector being bent away from the axis, the lower major portion being bent toward the axis more closely than the upper portion, a lens for said reflector having a flattened front and a marginal flange extending at a slight angle to its axis, the inner face of said front comprising a series of vertically extending parallel refraction prisms, the prisms at each side of the front being constructed to deflect the light toward said axis, the intermediate prisms having their upper ends terminating substantially at the axis of the reflector, said intermediate prisms being symmetrical to spread the light horizontally in both directions, and a source of light positioned in the focal region of said reflector.

9. In a vehicle lamp comprising a reflector having a focal region, the major portions above and below the axis of said reflector being bent toward the axis and the major side portions of the reflector being bent away from the axis, the lower major portion being bent toward the axis more closely than the upper portion, a lens for said reflector having a flattened, conical-shaped front and a marginal flange extending at a slight angle to its axis, the inner face of said conical-shaped front comprising a series of vertically extending parallel refraction prisms, the prisms at each side of the front extending substantially equal distances above and below the axis, said prisms being constructed to throw the light toward said axis, the intermediate prisms having their upper ends terminating substantially at the axis of the reflector, said intermediate prisms being symmetrical to spread the light horizontally in both directions, said reflector being tilted sufficiently to project the upper edge of said reflector well into said lens and to retract the lower edge of said reflector away from said lens, and a source of light positioned in the focal region of said reflector.

10. A concave reflector having a focal region, said reflector being deformed from a true and shallow surface of revolution, said reflector having substantial portions above and below the axis of said reflector bent toward the axis, and substantial portions of the side sections bent away from the axis, the lower substantial portion being bent toward the axis more closely than the other portions, the surface of said reflector being substantially in rear of the plane passing through the focal region thereof.

11. In a light projector, a light source, a shallow reflector surface above the axis of the projector deformed from a true surface of revolution and arranged in relation to the light source to project the rays from the light source directly forward in a beam having its upper boundary line convex, and a shallow reflector surface below said axis substantially in the rear of a plane passing through the light source deformed from a true surface of revolution and positioned with relation to the light source to receive the rays therefrom and project them forwardly in inverted position to produce a beam having its upper boundary line convex, whereby both beams projected by said reflecting surfaces will have corresponding upper convex boundary lines.

12. In a light projector, a light source, a shallow reflecting surface in the upper portion of the projector deformed from a true surface of revolution and arranged in relation to the light source to receive the rays therefrom and project them forwardly, and a reflecting surface in the lower portion of said projector substantially in the rear of a plane passing through the light source and deformed from a true surface of revolution, said last-mentioned surface being positioned with relation to the light source to project a substantially inverted beam of light having its upper boundary line curved downwardly and substantially superimposed on the beam projected by the upper reflecting surface.

In witness whereof, I hereunto subscribe my name, this 16 day of February, 1926.

WALTER D'ARCY RYAN.